United States Patent
Russell et al.

(10) Patent No.: US 11,859,715 B1
(45) Date of Patent: Jan. 2, 2024

(54) METHOD FOR SHIFTING A TRANSMISSION OF A VEHICLE INTO REVERSE

(71) Applicant: Sigma Powertrain, Inc., Livonia, MI (US)

(72) Inventors: Graham Scott Russell, Clarkston, MI (US); R. William Davis, Orion, MI (US); Daniel E. Knieper, Clarkston, MI (US); John W. Kimes, Clermont, FL (US)

(73) Assignee: Sigma Powertrain, Inc., Livonia, MI (US)

( * ) Notice: Subject to any disclaimer, the term of this patent is extended or adjusted under 35 U.S.C. 154(b) by 0 days.

(21) Appl. No.: 17/899,511

(22) Filed: Aug. 30, 2022

(51) Int. Cl.
*F16D 41/069* (2006.01)
*F16H 61/28* (2006.01)
*F16D 41/08* (2006.01)

(52) U.S. Cl.
CPC ....... *F16H 61/2807* (2013.01); *F16D 41/069* (2013.01); *F16D 41/084* (2013.01)

(58) Field of Classification Search
CPC ...... F16H 61/2807; F16D 41/04; F16D 41/06; F16D 41/069; F16D 41/08; F16D 41/084; F16D 41/10; F16D 41/12; F16D 41/16
See application file for complete search history.

(56) References Cited

U.S. PATENT DOCUMENTS

2017/0268585 A1* 9/2017 Heitzenrater ......... F16D 41/125
2021/0164526 A1* 6/2021 Kimes .................... F16D 48/06

FOREIGN PATENT DOCUMENTS

JP        H05126170 A  *   5/1993  ............ F16D 41/08

* cited by examiner

*Primary Examiner* — Tisha D Lewis
(74) *Attorney, Agent, or Firm* — Simonelli IP, PLLC

(57) ABSTRACT

A transmission is shifted into a reverse state. The transmission includes a clutch. The clutch includes a pocket plate, a notch plate, a first strut housed within a pocket of the pocket plate, and a second strut housed within another pocket. A command is received to shift the transmission to reverse. It is then determined whether the at least one second strut has retracted into the pocket plate. If it remains extended, the first actuator is activated. A first rotational torque is applied to the notch plate in a direction allowing the notch plate to abut the first strut. By doing so, the second strut is released from abutting engagement with the notch plate. A second rotational torque is applied to the notch plate opposite the first rotational torque to rotate the notch plate out of engagement with the first strut, resulting in the transmission entering the reverse state.

3 Claims, 12 Drawing Sheets

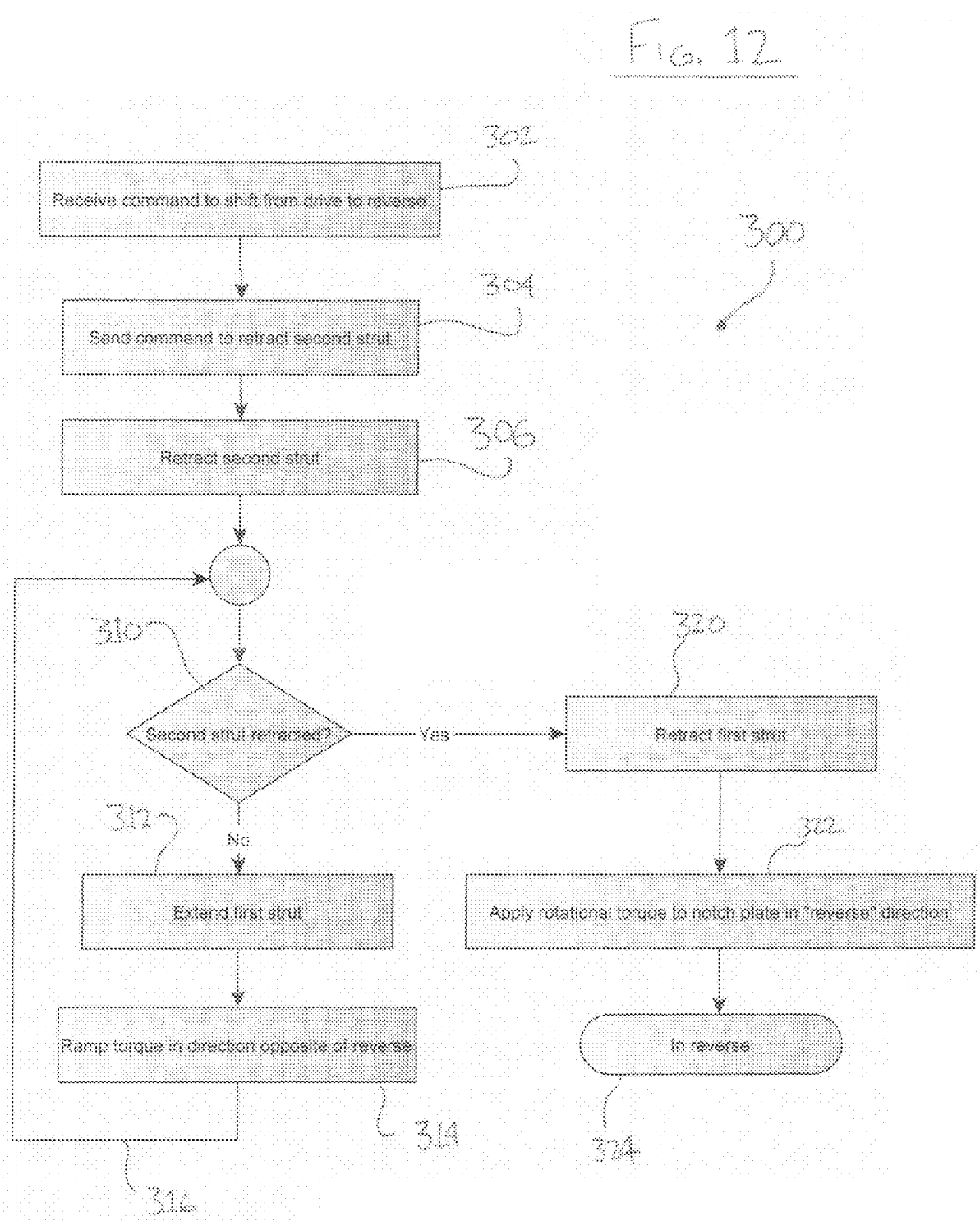

METHOD FOR SHIFTING A TRANSMISSION OF A VEHICLE INTO REVERSE

BACKGROUND ART

1. Field of the Invention

The invention relates to a method for shifting a transmission out of drive into reverse. More particularly, the invention relates to a method for shifting a transmission from drive into reverse using digital coupling components.

2. Description of the Related Art

All electric, hybrid electric, and plug-in hybrid electric vehicles (collectively referred to as EVs) have a powertrain to transfer power from various power generators to the driven wheels of the vehicle. Traditional transmissions utilize hydraulics and friction to operate. These two performance principles work well in the traditional transmission when powered by an internal combustion engine. The physics of these traditional transmission result in extreme amounts of energy waste, preventing their incorporation into EVs due to the limitations on range these losses create.

Transmissions in vehicles are used to control rotational torque to move the vehicle effectively and as efficiently as possible. Traditionally, transmissions employ hydraulic or pneumatic clutches (hydraulic clutches) to change gear ratios. Hydraulic clutches are, however, very inefficient in that much of the energy used to operate the hydraulic clutches is converted into thermal energy, much of which is dissipated into the atmosphere. In addition, hydraulic clutches require constant pressure to remain engaged, which further expends energy. This waste of energy is not acceptable in vehicles that use batteries as a primary energy source to create the motive force of the vehicle.

Digital clutches can be used to vastly reduce the amount of energy used during a change in gears of a transmission. In addition to consuming less energy to operate, digital clutches consume no energy once the transmission is in the desired gear state. However, digital clutches require a hill hold state in order for a vehicle to maintain its position on a hill without rolling down the hill, either forward or in reverse. Shifting while in such a state requires recognition that the transmission is in the hill-hold state before it can shift into reverse.

SUMMARY OF THE INVENTION

A method is disclosed for shifting a transmission into a reverse state, wherein the transmission includes at least one clutch. The clutch includes a pocket plate having a plurality of pockets, a notch plate having a plurality of notches, at least one first strut housed within one of the pockets of the pocket plate in a first orientation, at least one second strut housed within another of the pockets of the pocket plate in a second orientation, at least one first actuator for actuating the at least one first strut, and at least one second actuator for actuating the at least one second strut. The method begins by receiving a command to shift the transmission to reverse. Once the command is received, the at least one second actuator is deactivated. It is then determined whether the at least one second strut has retracted into the pocket plate. If it is determined the at least one second actuator remains in its extended position out past the one of the plurality of pockets, the at least one first actuator is activated. A first rotational torque is applied to the notch plate in a direction allowing the notch plate to abut the at least one first strut. By doing so, the at least one second strut is released from abutting engagement with the notch plate. A second rotational torque is applied to the notch plate opposite the first rotational torque to rotate the notch plate out of engagement with the at least one first strut, resulting in the transmission entering the reverse state.

BRIEF DESCRIPTION OF THE DRAWINGS

Advantages of the invention will be readily appreciated as the same becomes better understood by reference to the following detailed description when considered in connection with the accompanying drawings, wherein:

FIG. 12 is a flow chart of a method to shift a transmission for a vehicle into reverse.

DETAILED DESCRIPTION OF THE DRAWINGS

Figure 1A:
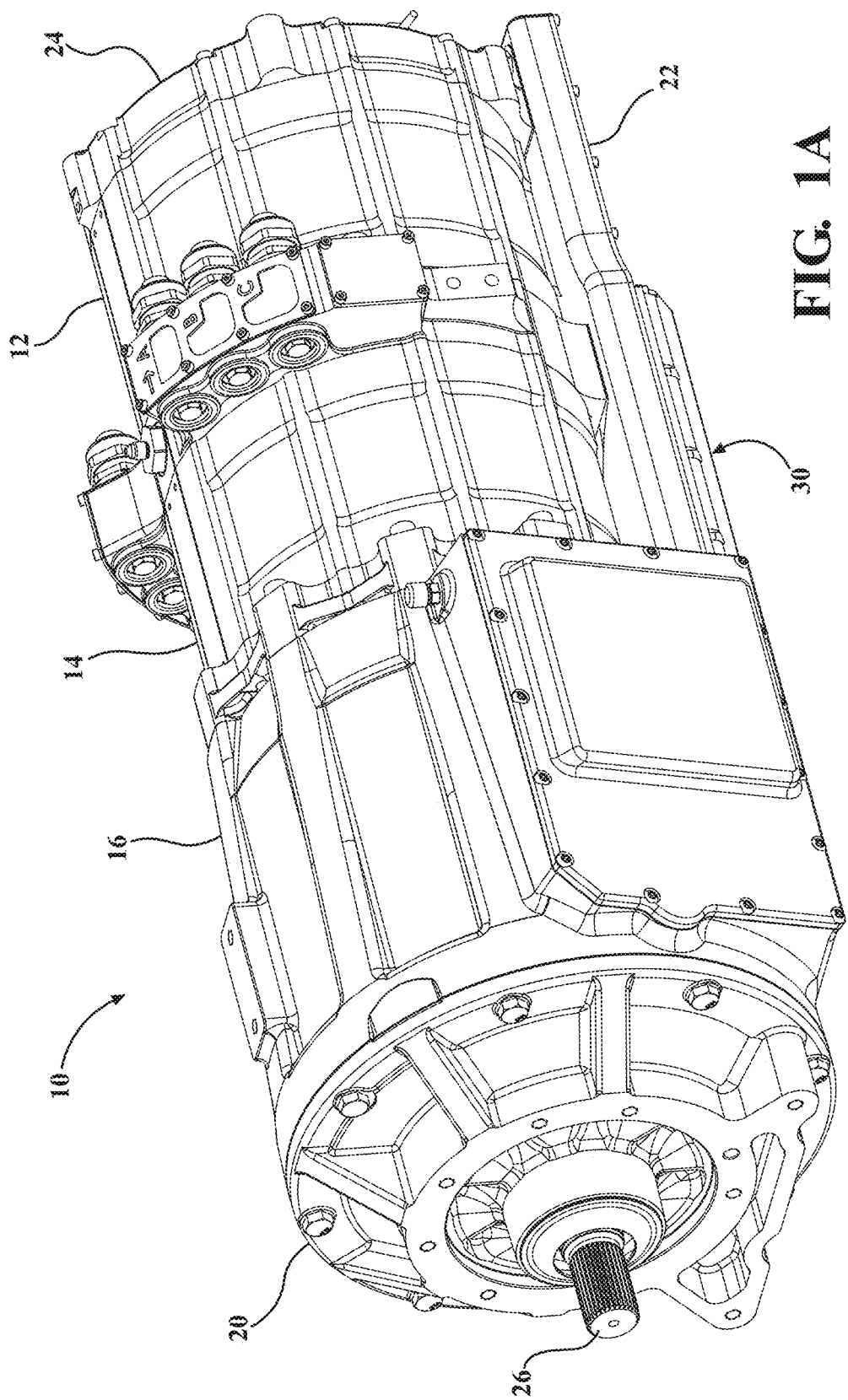
FIG. 1A is a perspective view of one embodiment of a vehicular powertrain.

For purposes of this discussion, elements will be identified by reference characters, typically reference numerals. There are a few embodiments shown in the Figures that will be described in detail below. For purposes of simplicity, these elements will retain their reference characters throughout the discussion. If an element has characteristics that are different from one embodiment to another, those differences will be discussed when introducing the same element for the new embodiment.

Referring to FIG. 1A, a perspective view of one embodiment of a transmission is generally shown at 10. In this Figure, the transmission 10 is operatively connected to a first motor 12 and a second motor 14. Physically, the second motor 14 is mounted to the transmission 10 between the transmission 10 and the first motor 12. The first motor 12 has an output (discussed subsequently) that extends through the second motor 14 and to the transmission 10.

Figure 1B:
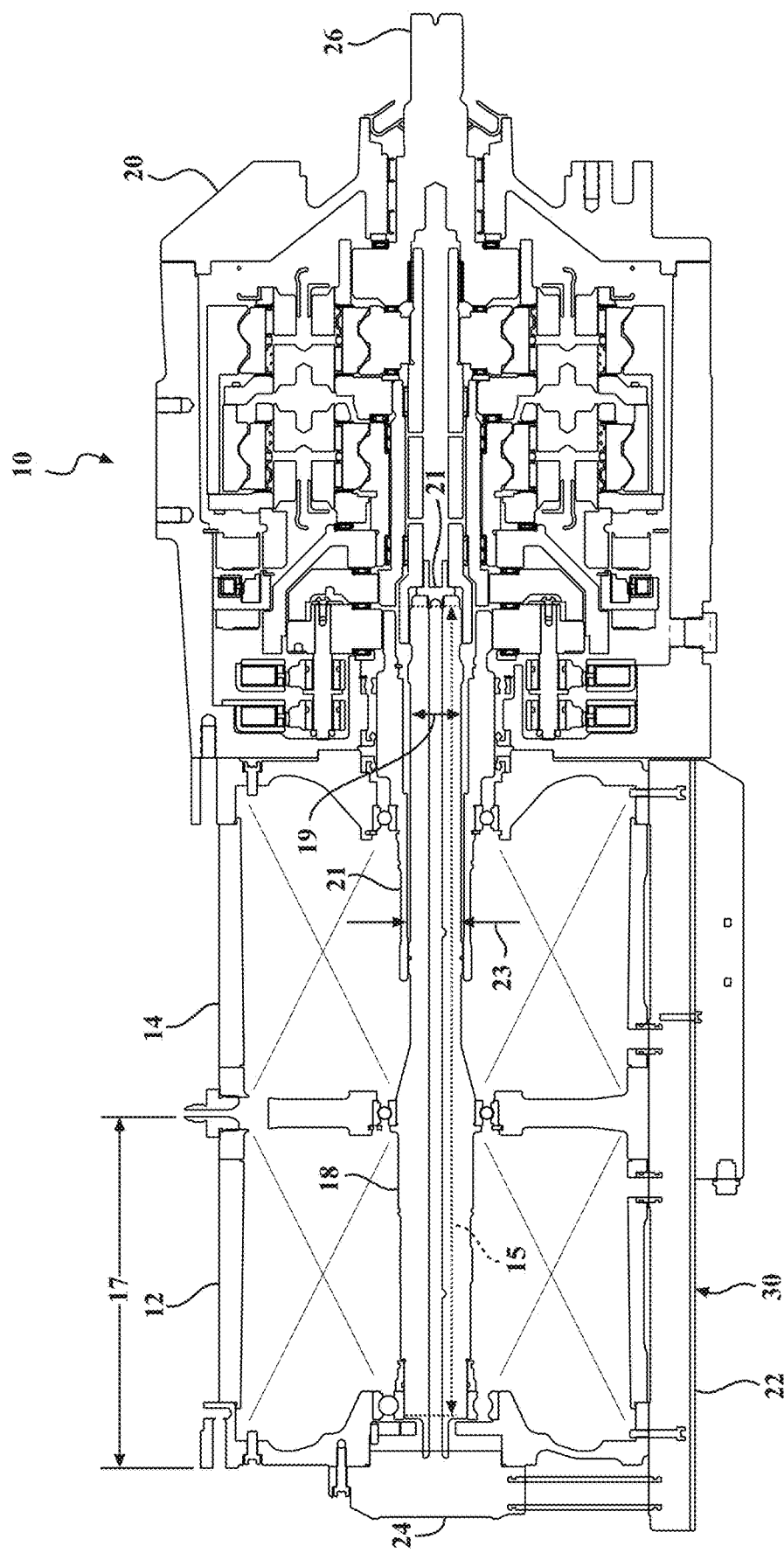
FIG. 1B is a schematic drawing of a cross-section of the embodiment shown in FIG. 1A.

The transmission 10 includes a transmission housing 16 having a housing cap 20. FIGS. 1A and 1B show the second motor 14 (B-Motor) secured to the transmission housing 16 and the first motor 12 (A-Motor) secured to the second motor 14 (B-Motor). A first motor output shaft 18 of the first motor 12 (A-Motor) defines a length 15 that is longer than a length 17 of the first motor 12. The first motor output shaft 18 also defines an outer diameter 19 at its distal end 21.

The second motor 14 (B-Motor) includes a second motor output shaft 21. The second motor output shaft 21 defines an inner diameter 23 that is larger than the outer diameter 19 of the first motor output shaft 18. The first motor output shaft 18 extends through and is coaxial with the second motor output shaft 21. It should be appreciated by those skilled in the art that the first motor output shaft 18 may not extend all the way through the second motor output shaft 21.

In alternative embodiments that will be discussed in greater detail below, the first 12 and second 14 motors may be mounted on either side of the transmission 10. Oil used to cool the transmission 10, the first motor 12 and the second motor 14 is collected by a catch basin 22 and recirculated using a pump housed within a sump 24. Because the catch basin 22 extends along the entire length of the transmission 10, the first motor 12 and the second motor 14, only one sump 24 is necessary. The transmission 10 has an output shaft 26 that extends out through the center of the housing cap 20. Electrical ports 28 provide electrical access (power and communications) inside the first 12 and second 14 motors. The transmission 10, first motor 12, second motor 14, and pump may be referred to as a powertrain, generally shown at 30.

Figure 2:
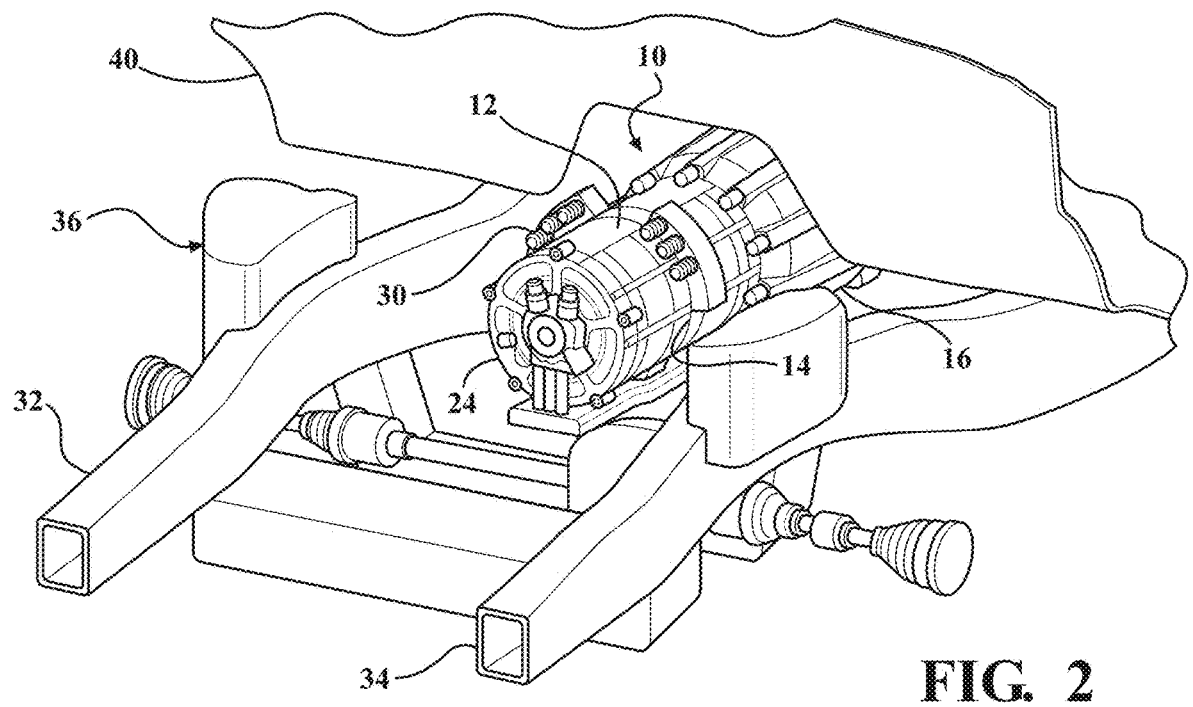
FIG. 2 is a perspective view of the powertrain embodiment shown in FIGS. 1A and 1B mounted to a vehicle.
Figure 3:
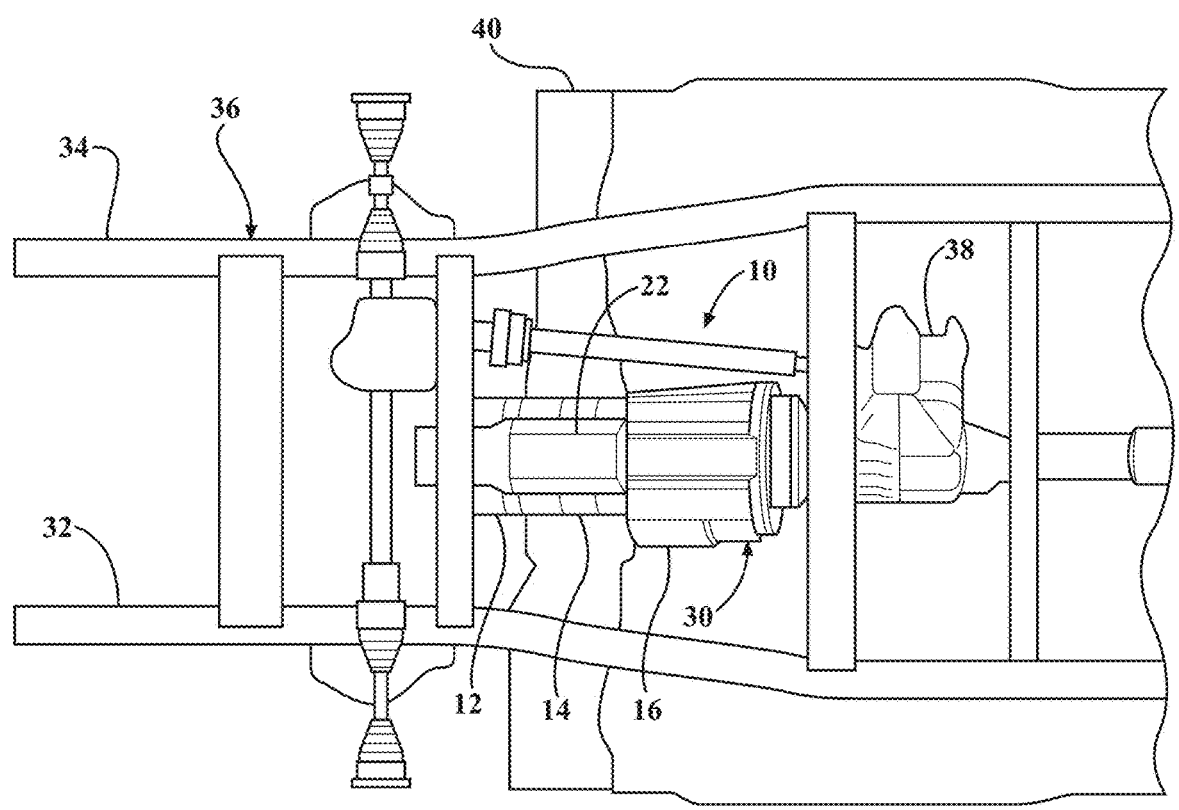
FIG. 3 is a bottom view of a vehicle with the powertrain embodiment shown in FIGS. 1A and 1B mounted thereto.

Referring to FIGS. 2 and 3, the powertrain 30 is shown mounted between two rails 32, 34 of a vehicular frame, generally shown at 36. A body 40, including a passenger compartment (not shown), is shown fixedly secured to the vehicular frame 36. Referring specifically to FIG. 3, the transmission 10 is shown connected to a drive line 38 that drives four wheels (none shown).

Figure 4:
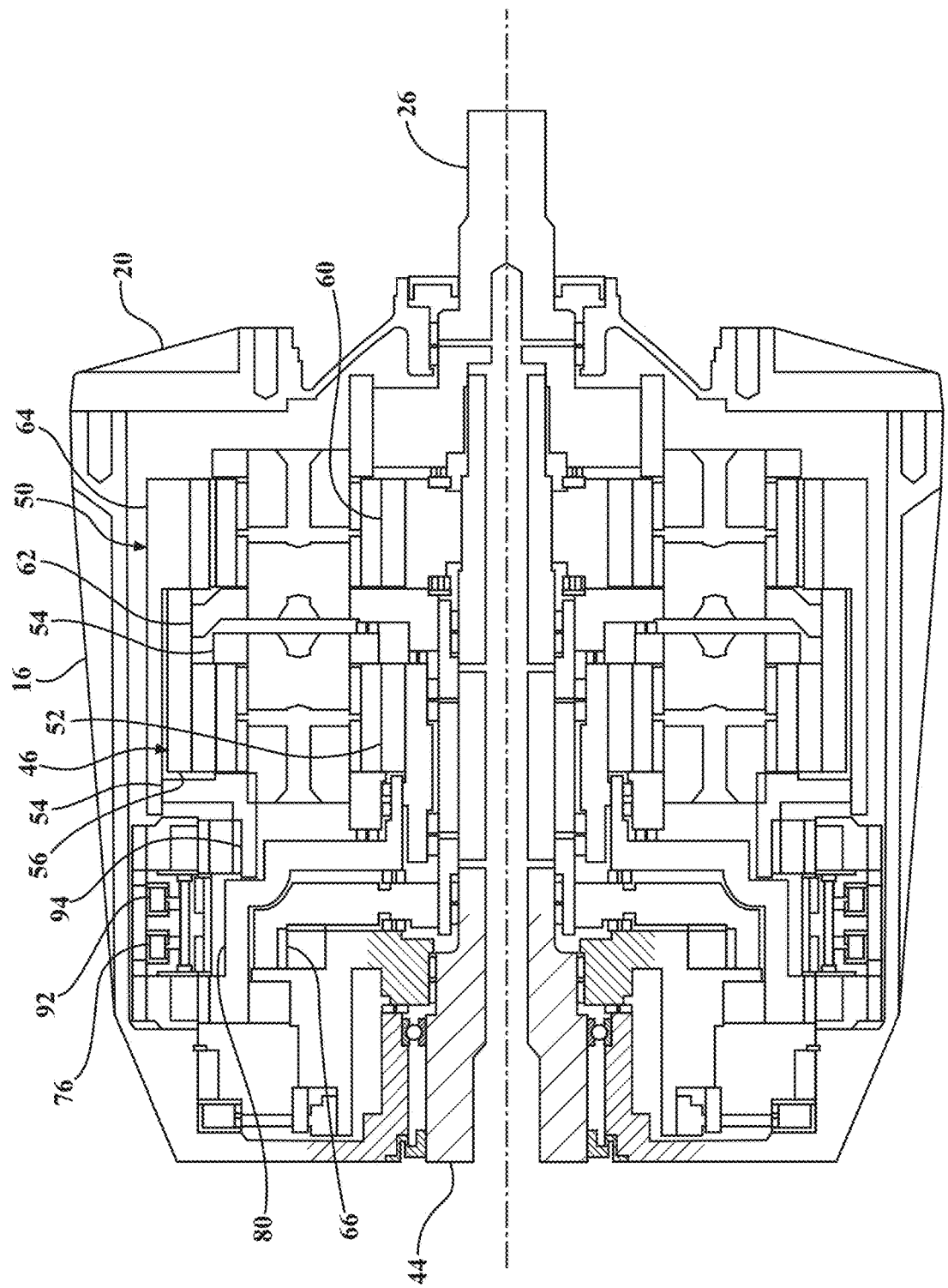
FIG. 4 is a cross-sectional side view of a transmission having one input.
Figure 5:
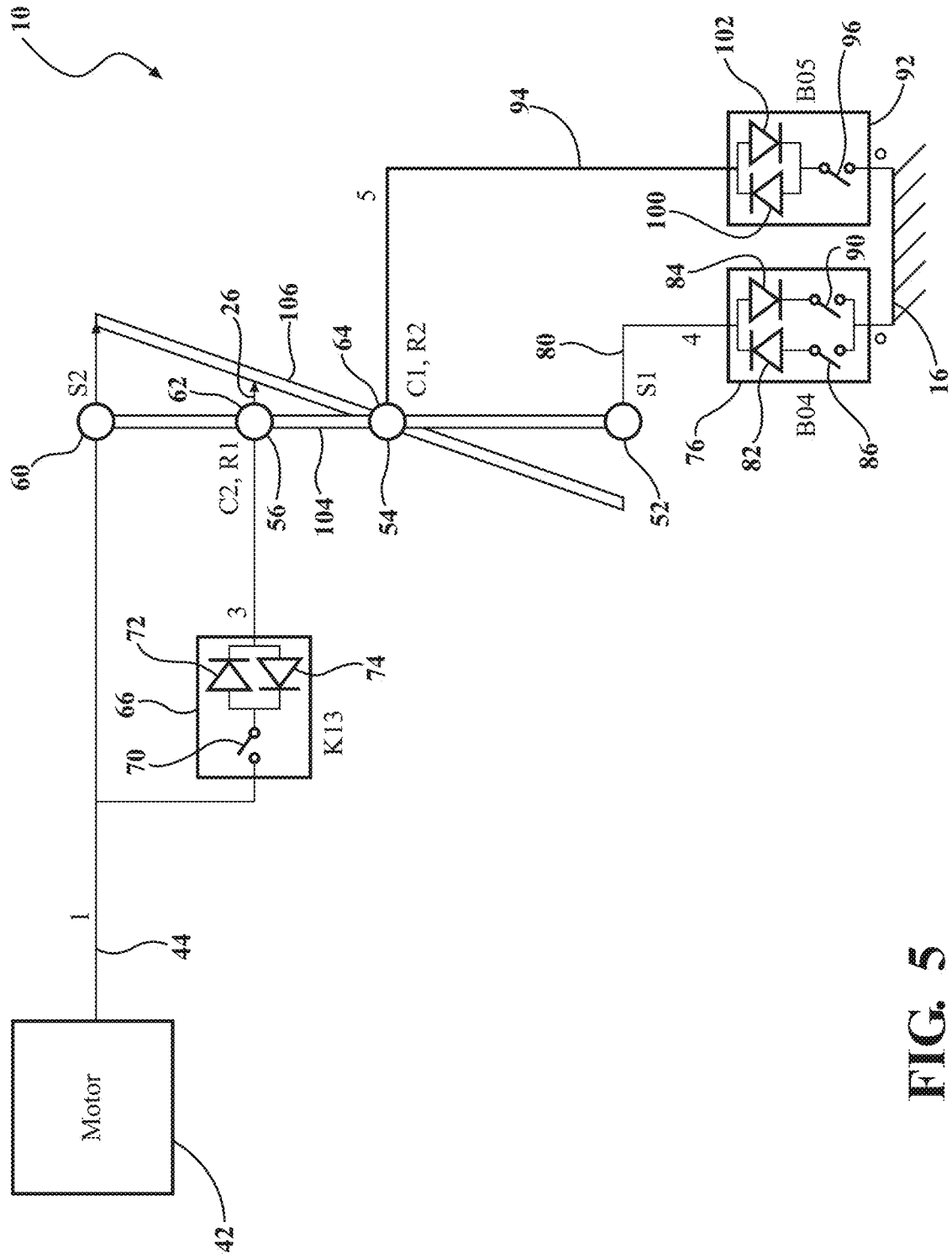
FIG. 5 is a lever diagram for the transmission shown in FIG. 4.

Referring to FIGS. 4 and 5, the transmission 10 is shown in a configuration for operating with a single input. In this configuration, the single input is the first motor 12 fixedly secured directly to the transmission housing 16 in the absence of the second motor 14. The first motor 12 is not shown in FIG. 4, but the first motor output shaft 18 would be received by the input shaft 44 of the transmission 10.

The input shaft 44 is also designated as shaft "1" in the power flow shown in FIG. 5. The transmission 10 also includes a first gearset, generally shown at 46, and a second gearset, generally shown at 50. The first gearset 46 includes first 52, second 54 and third 56 rotating members. The second gearset 50 includes a fourth 60, fifth 62, and sixth 64 rotating members. These gearsets 46, 50 may be any gearset that has three rotating members. Types of gearsets contemplated include, but are not limited to, Ravigneaux gearsets, Simpson gearsets and ring-carrier/ring-carrier gearsets. The gearsets 46, 50 shown in FIGS. 4 and 5 are ring-carrier/ring-carrier gearsets. Because these gearsets 46, 50 are ring-carrier/ring-carrier gearsets, the first 52, second 54 and third 56 rotating members are a sun gear, a carrier and a ring gear, respectively. These are indicated as S1, C1, and R1 for the first gearset 46 and S2, C2, and R2 for the second gearset 50. Two rotating members from the first gearset 46 and two rotating members from the second gearset 50 are fixedly secured to each other. These connections create a four-node linkage for the transmission 10. As such, each pair of rotating members is represented by a single circle in FIG. 5. Therefore, the first rotating member 56 (ring gear R1) and the fifth rotating member 62 (carrier C2) are fixedly secured to each other and represented by both reference numerals 56 and 62 in FIG. 5, whereas the second rotating member 54 (carrier C1) and the sixth rotating member 64 (ring gear R2) are fixedly secured to each other and represented by both reference numerals 54 and 64 in FIG. 5.

The output shaft 26 of the transmission 10 is also fixedly secured to two rotating members, one from each gearset 46, 50. In the embodiment shown in FIGS. 4 and 5, the output shaft 26 is fixedly secured to the third rotating member 56 (the ring gear R1 of the first gearset 46 and the fifth rotating member 62 of the second gearset 50 (the carrier C2 of the second gearset 50). The motor 12 is connected directly to the fourth rotating member 60 of the second gearset 50 using the input shaft 44 (shaft 1).

The output shaft 26 of the transmission 10 is also fixedly secured to two rotating members, one from each gearset 46, 50. In the embodiment shown in FIGS. 4 and 5, the output shaft 26 is fixedly secured to the third rotating member 56 (the ring gear R1 of the first gearset 46 and the fifth rotating member 62 of the second gearset 50 (the carrier C2 of the second gearset 50). The motor 12 is connected directly to the fourth rotating member 60 of the second gearset 50 using the input shaft 44 (shaft 1).

A controllable clutch 66 is connected between the input shaft 44 (shaft 1) at one end and the output shaft 26 (shaft 3) at the other end. The controllable clutch 66 is also represented by the nomenclature K13 because it couples shafts 1 and 3 together. Referring specifically to FIG. 5, the controllable clutch 66 is represented by a switch 70 and two diodes 72, 74. These three elements 70, 72, 74 represent the attributes of the controllable clutch 66. More specifically, the switch 70 signifies that the controllable clutch 66 may be turned on and off. The diodes 72, 74 represent the fact that the controllable clutch 66 will the third rotating member 56 (ring gear R1), the fifth rotating member 62 (second carrier C2) and the output shaft 26 (shaft 3) to lock in both directions, or to rotate freely in both directions. Therefore, when the switch 70 is closed, representing the active state for the controllable clutch 66, the output shaft 26 rotates with the rotation of the input shaft 44. When the switch 70 is open, representing an inactive state for the controllable clutch 66, the output shaft 26 does not rotate or, alternatively, rotates based on the torques it receives from the other rotating elements 52, 54, 60, 64 of the first 46 and second 50 gearsets.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects shaft 0 (which is just the transmission housing 16) with a fourth shaft 80 (shaft 4). The first controllable brake 76 (B04) is similar to the controllable clutch 66 in that it is represented by two diodes 82, 84 representing that it will lock and allow rotation in either direction. The first controllable brake 76 (B04) is different from the controllable clutch 66 in that each direction of operation can be controlled independently of the other, as represented by switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only has the ability to control whether a notch plate 94 (shaft 5) is rotating or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock or allow the notch plate 94 (shaft 5) rotate in either direction.

Figure 6:
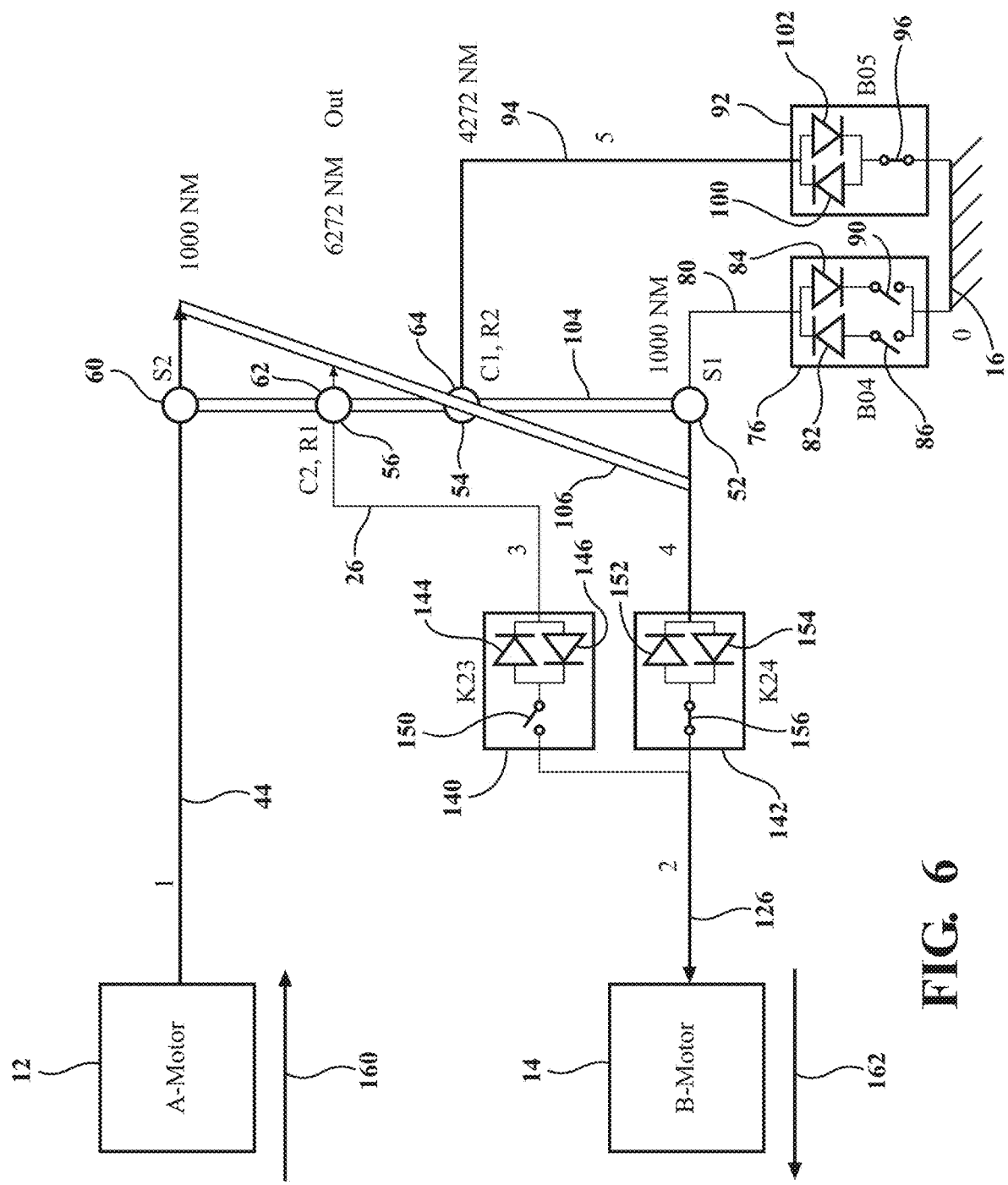
FIG. 6 is a lever diagram for the transmission shown in FIGS. 1A and 1B.

Referring to FIG. 6, a lever diagram showing the transmission 10 having two inputs (FIG. 1) is shown. The lever diagram is substantially similar to lever diagram for the single-input transmission shown in FIG. 5. One difference between the two configurations is the transmission 10 has two input shafts 44, 126, wherein the first input shaft 44 receives torque from the first motor 12 (A-Motor) and the second input shaft 126 receives torque from the second motor 14 (B-Motor). Another difference between the two configurations is the use of two controllable clutches 140 (K23), 142 (K24) instead of the single controllable clutch 66 (K13).

The output of the first motor 12 (A-Motor) is received by the first input shaft 44 (shaft 1), which is fixedly secured to the fourth rotating member 60 (sun gear S2) of the second gearset 50. The output of the second motor 14 (B-Motor) is received by the second input shaft 126 (shaft 2). The second input shaft 126 (shaft 2) is connected to the first controllable clutch 140 (K23) and the second controllable clutch 142 (K24). The first controllable clutch 140 (K23) operates in both directions as is indicated by the diodes 144, 146, which are oriented in opposite directions. A switch 150 illustrates that the clutch 140 (K23) is controllable and may be locked or allowed to rotate in both directions. The second controllable clutch 142 (K24) operates in both directions, as is indicated by the diodes 152, 154, which are oriented in opposite directions. A switch 156 illustrates that the controllable clutch 142 (K24) is controllable and may be locked or allowed to rotate in both directions.

The first controllable clutch 140 (K23) couples the second input shaft 126 (shaft 2) and the output shaft 26 (shaft 3). The second controllable clutch 142 (K24) couples the second input shaft 126 (shaft 2) with the fourth shaft 80 (shaft 4). As discussed above, the output shaft 26 is fixedly secured to both the third rotating member 56 (ring R1) of the first gearset 46 and the fifth rotating member 62 (carrier C2) of the second gearset 50.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects the transmission housing 16 (shaft 0) with a fourth shaft 80 (shaft 4). The first controllable brake 76 is similar to the controllable clutches 140, 142 in that it is represented by two diodes 82, 84 representing operation in either direction. The first controllable brake 76 is different from the controllable clutches 140, 142 in that each direction of operation can be controlled independently of the other, as represented by the two switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only can control whether a notch plate 94 (shaft 5) is rotating, or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock in both directions or it can move freely in both directions.

Because the first 46 and second 50 gearsets are ring-carrier/ring-carrier gearsets, the connections described in the power flow in FIG. 5, and the first 18 and second 19 motor output shafts are coaxial, the second motor 14 (B-Motor) is able to drive the output shaft 26 (shaft 3) directly. The number of modes of operation increase due to this capability. In the embodiments shown in the Figures, the first motor output shaft 18 extends through the second motor output shaft 19. As such, the second motor output shaft 19 is hollow providing a space through which the first motor output shaft 18 extends.

In FIG. 6, the steady-state lever 104 represent when the host vehicle is not in motion. The operational lever 106 represents when the vehicle is moving through the operation of the first motor 12 (A Motor) and/or the second motor 14 (B Motor). The first controllable clutch 140 (K23) is open as represented by the switch 150 being open. In addition, the second controllable clutch 142 (K24) is closed. Therefore, the second motor 14 (B Motor) is coupled to the first rotating member 52 (sun gear S1) of the first gearset 46. The first rotating member 52 (sun gear S1) is not grounded to the transmission housing 16 because the first controllable brake 76 (B04) is open. Finally, the second controllable brake 92 (B05) is closed tying the second rotating member 54 (carrier C1) of the first gearset 46 and the sixth rotating member 64 (ring gear R2) of the second gearset 50 are ground to the transmission housing 16 through the notch plate 94 (shaft 5).

In this configuration, the first motor 12 is operating in the forward direction, indicated by arrow 160, and the second motor 14 is operating in the reverse direction, indicated by arrow 162. By way of example, and in not to be limiting, exemplary torques are provided based on the designs of the gearsets 46, 50 and the motors 12, 14. Given the output of the first motor 12 (A Motor) provides a torque of 1000 NM on the second sun gear 60 (sun gear S2) and the output of the second motor 14 provides a torque of 1000 NM in the opposite direction on the first rotating member 52 (sun gear S1) results in a torque of 4272 NM on the second rotating member 54 (carrier C1) of the first gearset 46 and the sixth rotating member 64 (ring gear R2) of the second gearset 50 and an output torque of 6272 NM at the output shaft 26. This is "first gear." The transmission 10 is more fully described in U.S. Pat. No. 10,711,867, which is co-owned by Applicant, and the disclosure therein is expressly incorporated herein by reference.

Referring to FIGS. 7 through 11, clutch elements are shown in various stages of operation to facilitate the shifting of the transmission 10 into reverse from two distinct "states" of the transmission 10. In the first state, the transmission is in a "drive-ready" state. For purposes of this discussion the drive-ready state is the vehicle transmission 10 is ready to go forward but the at least one second strut 236 is extended and mechanically engaged with a notch 246 of the notch plate 250. As such, the at least one second strut 236 has not yet retracted in the pocket 226 even though the second actuator 202 has been deactivated. As a point of distinction, if the transmission 10 is in a drive hill-hold mode, the at least one second strut 236 is in the same position as if it were in the drive ready mode, but the at least one second actuator 202 is in an activated condition with the plunger of the at least one second actuator 202 extended into the second pocket 226 to prevent the at least one second strut 236 from retracting.

The clutch elements are used for brake clutches. In the embodiment shown, the clutch elements are a part of the first controllable brake 76 (B04). It should be appreciated by those skilled in the art that these clutch elements could be used with any of the independently controllable clutches used in this transmission 10.

Figure 7:
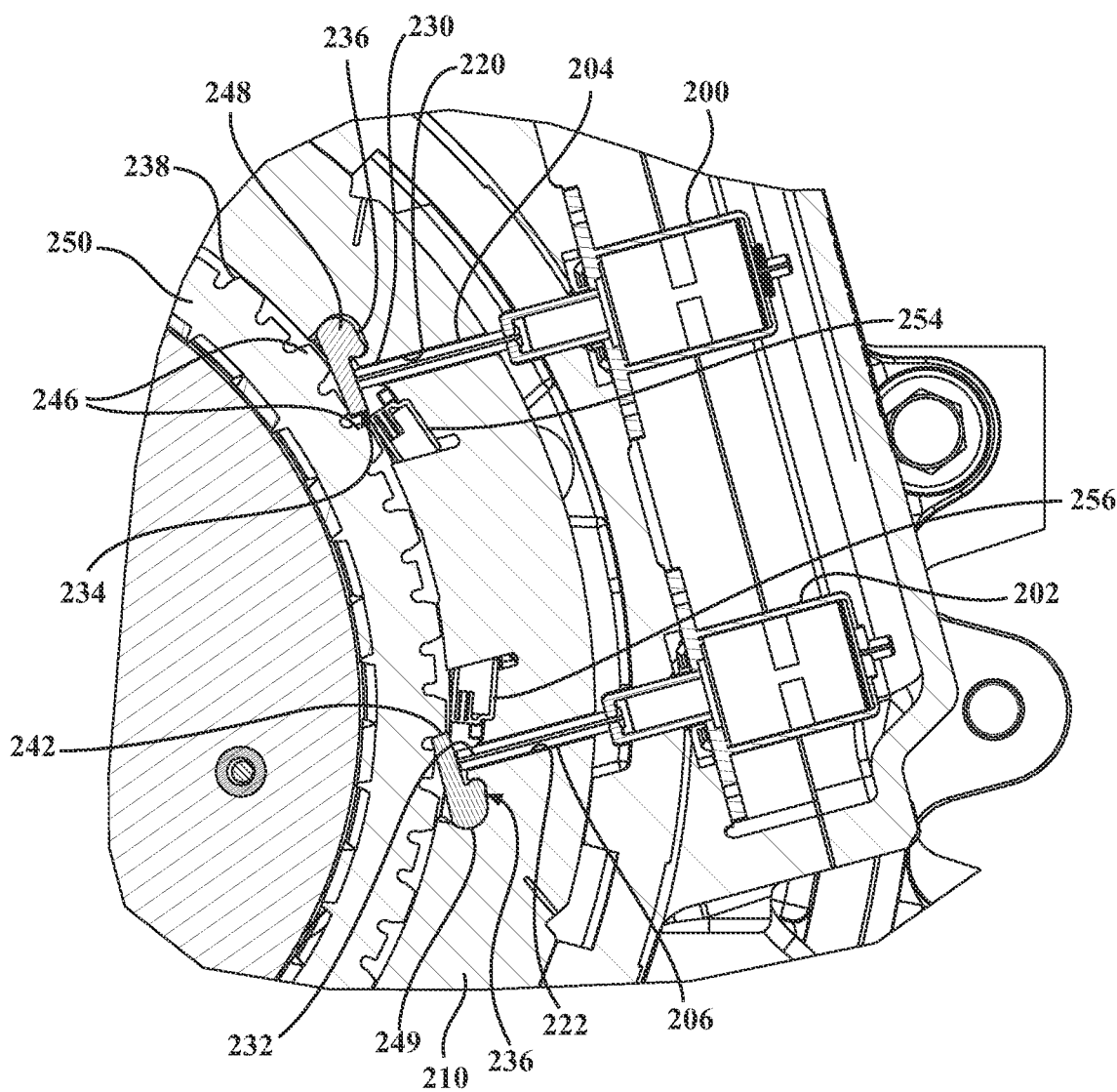
FIG. 7 is a cross-sectional side view, partially cut away, of the first and second directional struts used to control elements of a clutch with the first directional strut in its retracted position and the second directional strut in its extended position.
Figure 9:
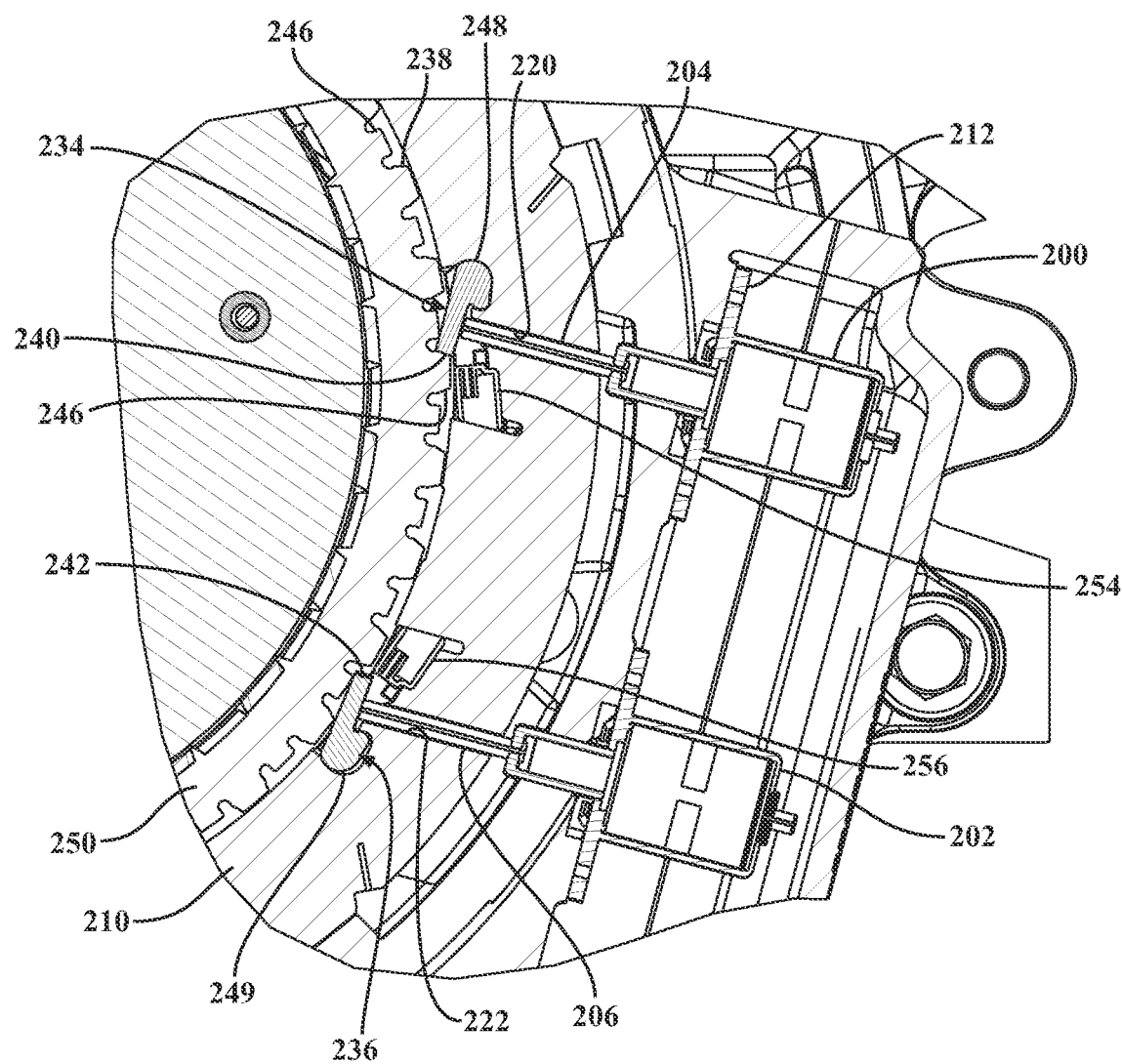
FIG. 9 is a cross-sectional side view, partially cut away, of first and second directional struts used to control elements of a clutch, with both the first and second directional struts remaining in the extended position when a second actuator is off.

Referring specifically to FIG. 7, the clutch elements shown include first 200 and second 202 actuators. In the embodiment shown, the first 200 and second 202 actuators are solenoids, each having a plunger 204, 206, respectively. The actuators 200, 202 are fixedly secured to a pocket plate 210 using a mounting plate 212 and a plurality of bolts 214 (FIG. 9). Electrical power to and control of the two actuators 200, 202 come through a communications module as represented by wire harness connector 216 (FIG. 9) as is known in the art. The plungers 204, 206 extend through channels 220, 222, respectively, in the pocket plate 210 and into first 224 and second 226 pockets disposed adjacent an inner diameter of the pocket plate 210. The channels 220, 222 allow the plungers 204, 206 to move axially between respective extended positions (FIG. 7) wherein distal ends 230, 232 of the plungers 204, 206 extend into the pockets 224, 226 of the pocket plate 210, and retracted positions (FIG. 9).

In each of the first 224 and second 226 pockets are first 234 and second 236 struts. The struts 234, 236 reside in the pockets 224, 226. In their extended positions, engagement portions 240, 242 of the struts 234, 236 are extend out of the pockets 224, 226 and engage notches 246 in a notch plate 250. Cam surfaces 248, 249 of the first 234 and 236 struts move along interior surfaces of the pockets 224, 226, respectively. More specifically, the engagement portions 240, 242 of the struts 234, 236 engage respective notch walls 238, 239 of the notches 246. When the struts 234, 236 pivot from their extended position to their respective retracted positions within their respective pockets 224, 226, they no longer engage the notch plate 250. Position modules 254, 256 identified the position of the struts 234, 236. The position modules 254, 256 include sensors to sense the position or orientation of the struts 234, 236. Examples of position sensors are described in US patent application owned by Applicant, having Ser. No. 17/495,062, the specification of which is hereby incorporated by reference. It should be appreciated by those skilled in the art that a clutch may include a plurality of these actuator/strut pairs and only a pair of these actuator/strut assemblies are shown in the Figures for purposes of simplicity.

FIG. 7 is a default starting position of the clutch elements using the method described herein. In FIG. 7, the pocket plate 210 is fixed to ground (typically, the transmission housing 16) and a portion of the struts (some from each direction) 234, 236 are extended into notches 246 of the notch plate 250. It should be appreciated by those skilled in the art that not all struts 234, 236 need to be extended into their respective notches 246—only that at least one of each pointing in opposite directions. This prevents the notch plate 250 from rotating in either direction.

In this example, preventing the notch plate 250 from rotating in either direction creates a drive state for the transmission 10. Said another way, the transmission 10 is in a forward drive gear when the notch plate 250 is prevented from rotating (and the other brake clutch 92 (B05) is also engaged). If the transmission 10 were used for something other than a vehicle, the condition would prevent movement of whatever the transmission 10 is designed to move.

Turning attention to FIG. 12, the method used to operate the clutch elements move from a drive condition to a reverse condition is generally shown at 300. The method 300 begins at 302 when it receives a command to shift the transmission 10 to reverse. The method 300 deactivating the at least one second clutch actuator 202 at 304. This step 304 is designed to release the at least one second strut 236, which may or may not occur because it may or may not be loaded. Once the at least one second strut 236 is released, it either retracts or attempts to retract into its second pocket 226.

It is then determined at 310 whether the at least one second strut 236 has retracted into the second pocket 226 of the pocket plate 210. This determination is made by the second position module 256, which as discussed above, includes a sensor to determine the location of the at least one second strut 236.

Figure 8:
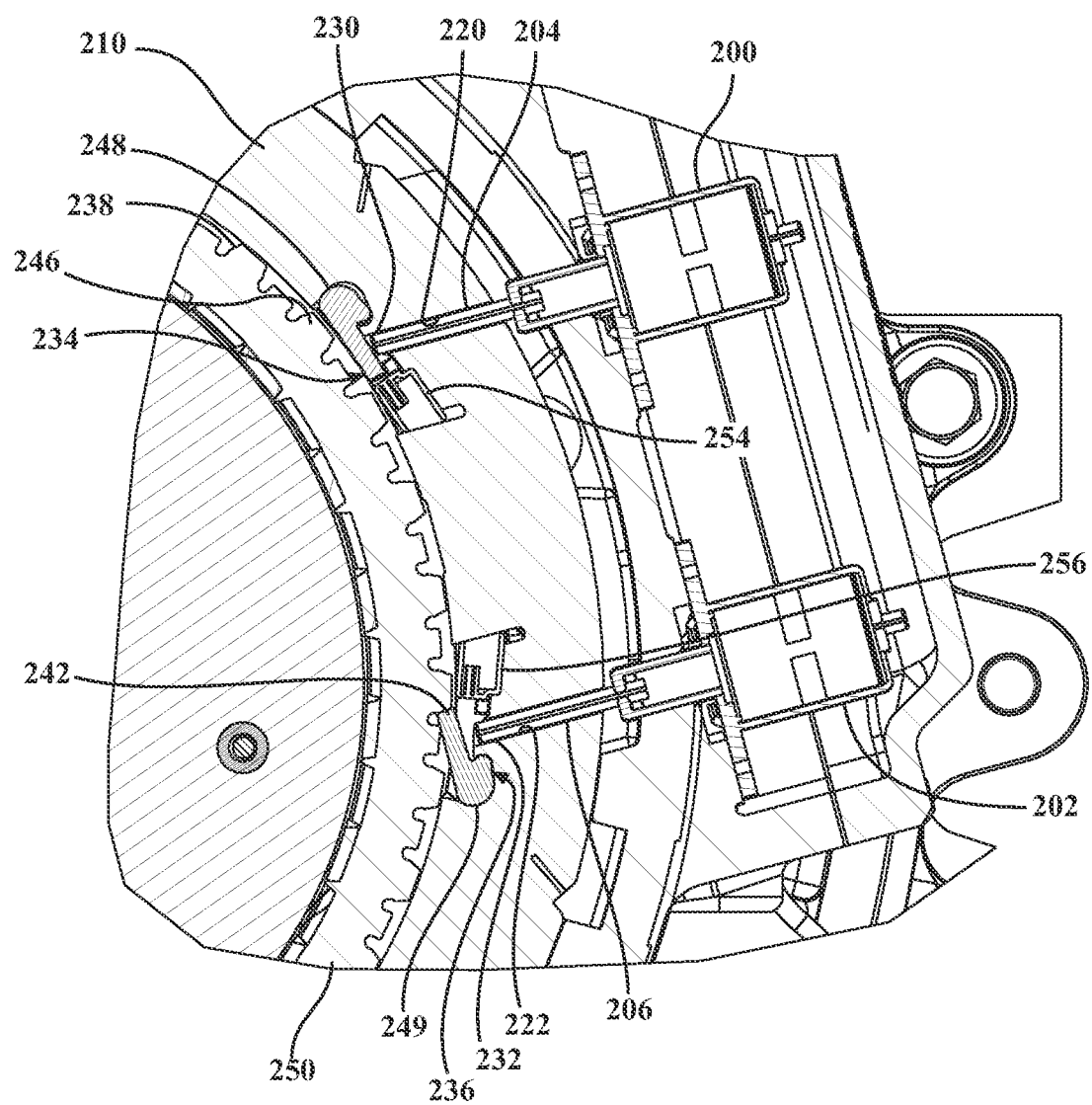
FIG. 8 is a cross-sectional side view, partially cut away, of the first and second directional struts used to control elements of a clutch with the first directional strut in its retracted position and the second directional strut still in its extended position and the second actuator deactivated.

If the at least one second strut 236 has not been retracted (as is shown in FIG. 8), the method 300, activates at 312 the at least one first clutch actuator 200 (FIG. 9). This occurs when it is determined the at least one second strut 236 remains in its extended position out past the second pocket 226 (as defined by the pocket plate inner diameter 244). There are times when the at least one second strut 236 will not retract even though the second clutch actuator 202 has retracted its plunger 206. This occurs if the at least one second strut 236 is loaded. More specifically, it occurs when the engagement portion 240 of the at least one second strut 236 and the notch wall 239 of the notch 246 are abutting each other with a force that overcomes the force being applied to the at least one second strut 236 by a biasing spring (not shown) that biases the at least one second strut 236 to retract into the second pocket 226 absent any other forces acting on the at least one second strut 236.

Figure 10:
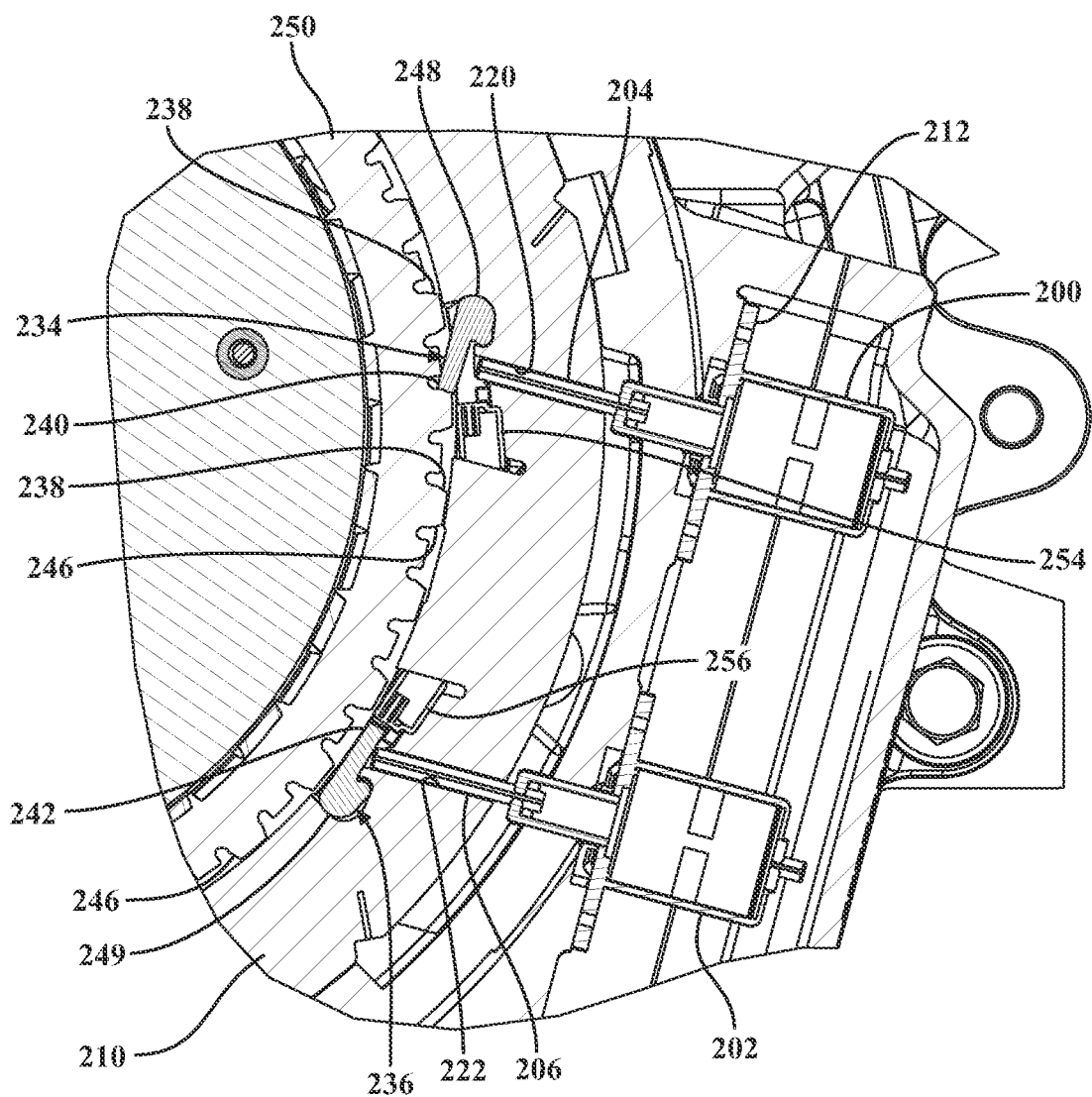
FIG. 10 is a cross-sectional side view, partially cut away, of first and second directional struts with the first directional strut in its extended position and the second directional strut in its retracted position.

Once the at least one first strut 234 is activated, a first rotational torque is applied at 314 to the notch plate 250 that is opposite of the direction of reverse (also FIG. 9). This first rotational torque applied to the notch plate 250 will unload the forces acting on the at least one second strut 236 allowing it to retract into its at least one second pocket 226 (FIG. 10). The first rotational torque applied at 314 will be gradual ramp so as to not unduly increase noise and vibration. Once the first rotational torque has been applied sufficiently, the method 300 loops back at 316 to confirm at 310 that the at least one second strut 236 has been retracted. If not, the steps 312 through 316 are repeated until confirmation that the at least one second strut 236 has been retracted.

Figure 11:
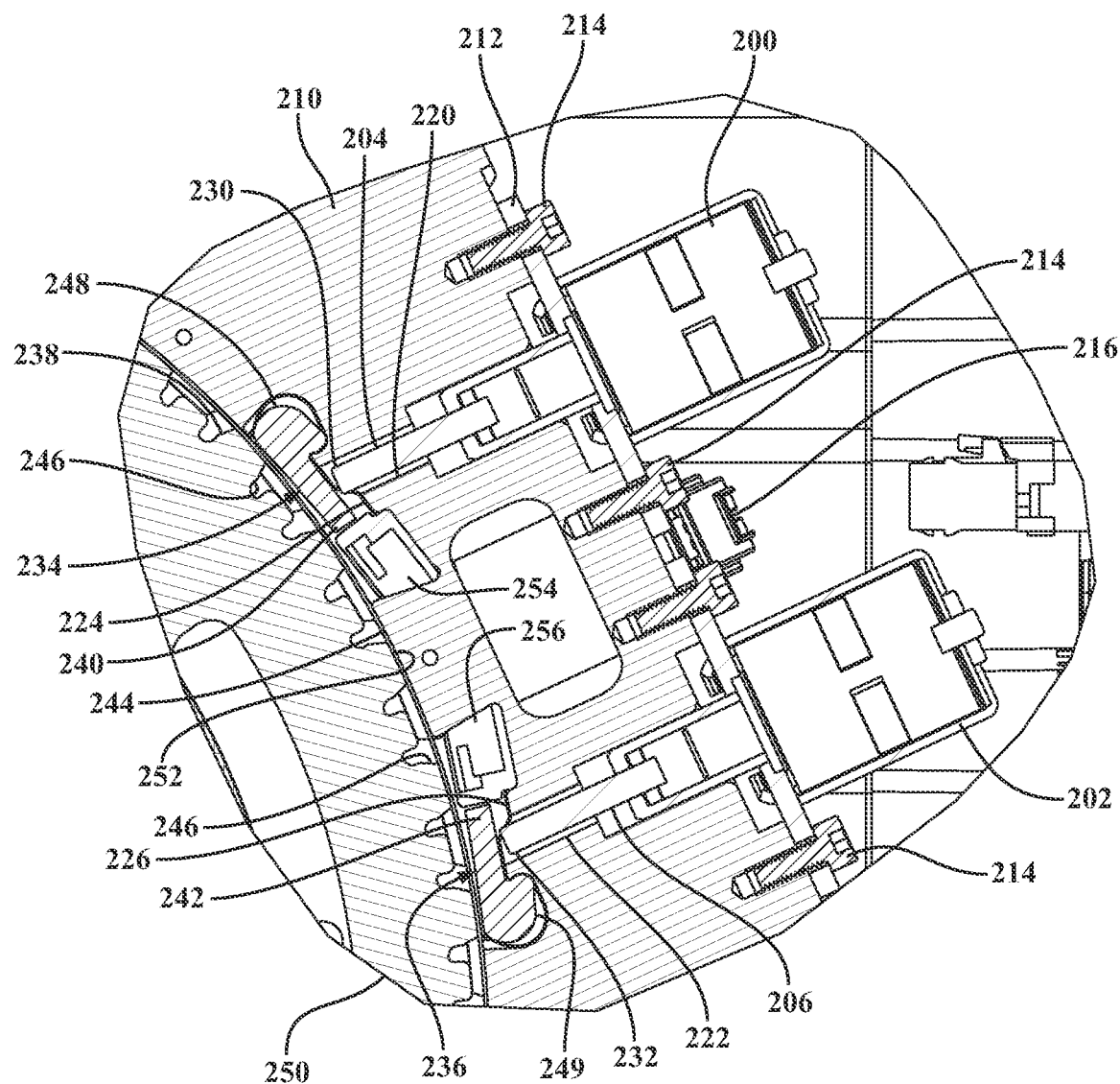
FIG. 11 is a cross-sectional side view, partially cut away, of first and second directional struts used to control elements of a clutch in their respective retracted positions.

If the at least one second strut 236 has been retracted, the method 300 commands the first strut 234 to retract at 320 (FIG. 11). Once the at least one second strut 236 is retracted, the torque applied the notch plate 250 is ramped or reduced to zero. At this point, the transmission 10 is either in reverse ready or reverse, depending on whether the first strut 234 stays extended or retracts, respectively a reverse rotational torque can be applied to the notch plate 250 at 322. The direction of the reverse rotational torque applied is in a direction such that the transmission 10 is in reverse at 324.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for shifting a transmission from a drive state, wherein the transmission includes at least one clutch, wherein the clutch includes a pocket plate having a plurality of pockets, a notch plate having a plurality of notches, at least one first strut housed within one of the pockets of the pocket plate in a first orientation, at least one second strut housed within another of the pockets of the pocket plate in a second orientation, at least one first actuator for actuating the at least one first strut, and at least one second actuator for actuating the at least one second strut, the method comprising the steps of:

receiving a command to shift the transmission to reverse;

deactivating the at least one second actuator;

determining whether the at least one second strut retracted into the pocket plate;

activating the at least one first actuator to move the at least one first strut into its extended position when it is determined the at least one second strut remains in its extended position out past the one of the plurality of pockets;

applying a first rotational torque to the notch plate in a direction allowing the notch plate to abut the at least one first strut to release the at least one second strut from abutting engagement with the notch plate resulting in the transmission entering a reverse ready state; and applying a second rotational torque opposite the first rotational torque to rotate the notch plate out of engagement with the at least one first strut resulting in the transmission entering a reverse state.

2. A method as set forth in claim 1 including the step of deactivating the at least one first actuator after the step of determining whether the at least one second strut is retracted.

3. A method as set forth in claim 1 including the step of deactivating the at least one second actuator prior to the step of determining whether the at least one second strut is retracted.

\* \* \* \* \*